US012558742B2

(12) United States Patent (10) Patent No.: US 12,558,742 B2

Schaal et al. (45) Date of Patent: Feb. 24, 2026

---

(54) METHODS FOR DETECTING A WORKING AREA OF A GENERATIVE MANUFACTURING DEVICE AND MANUFACTURING DEVICES FOR GENERATIVELY MANUFACTURING COMPONENTS FROM A POWDER MATERIAL

(71) Applicant: TRUMPF Laser- und Systemtechnik GmbH, Ditzingen (DE)

(72) Inventors: Frederik Schaal, Fellbach (DE); Matthias Allenberg-Rabe, Ludwigsburg (DE); Valentin Blickle, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 875 days.

(21) Appl. No.: 17/317,425

(22) Filed: May 11, 2021

(65) Prior Publication Data

US 2021/0260663 A1 Aug. 26, 2021

Related U.S. Application Data

(63) Continuation of application No. PCT/EP2019/080871, filed on Nov. 11, 2019.

(30) Foreign Application Priority Data

Nov. 12, 2018 (DE) .......................... 102018219301.0

(51) Int. Cl.
   *B23K 26/342* (2014.01)
   *B22F 10/25* (2021.01)
   (Continued)

(52) U.S. Cl.
   CPC ............ *B23K 26/342* (2015.10); *B22F 10/28* (2021.01); *B22F 10/366* (2021.01); *B22F 10/39* (2021.01);
   (Continued)

(58) Field of Classification Search
   CPC ...... B23K 26/342; B33Y 10/00; B33Y 30/00; B33Y 50/02; B22F 10/85; B22F 12/44;
   (Continued)

(56) References Cited

U.S. PATENT DOCUMENTS 11,358,224 B2 6/2022 Brown
2010/0264302 A1* 10/2010 Philippi ............... B23K 26/144
250/252.1

(Continued)

FOREIGN PATENT DOCUMENTS

CN 108463300 A 8/2018
DE 102016222186 4/2018
(Continued)

OTHER PUBLICATIONS

CN Office Action in Chinese Appln. No. 201980074708.2, dated Jan. 28, 2023, 23 pages (with English translation).
(Continued)

*Primary Examiner* — Elizabeth M Kerr
*Assistant Examiner* — Simpson A Chen
(74) *Attorney, Agent, or Firm* — Fish & Richardson P.C.

(57) ABSTRACT

Methods for detecting a working area of a generative manufacturing device and manufacturing devices for generatively manufacturing components from a powder material are disclosed. The methods include scanning of an optical working beam of the generative manufacturing device in the working area, detecting signal values of remitted light of the optical working beam traveling along an optical axis of the optical working beam in a location-
(Continued)

dependent manner, wherein a signal value is assigned to each location of the scan of the optical working beam in the working area, and obtaining an image of the working area from the location-dependent detected signal values. The optical working beam for detecting the working area is operated with an optical output power that is reduced compared to a lower power limit for the optical output power of the optical working beam used during generative manufacturing.

13 Claims, 2 Drawing Sheets

(51) Int. Cl.

| | |
|---|---|
| *B22F 10/28* | (2021.01) |
| *B22F 10/36* | (2021.01) |
| *B22F 10/366* | (2021.01) |
| *B22F 10/39* | (2021.01) |
| *B22F 10/85* | (2021.01) |
| *B22F 12/41* | (2021.01) |
| *B22F 12/43* | (2021.01) |
| *B22F 12/44* | (2021.01) |
| *B22F 12/49* | (2021.01) |
| *B22F 12/90* | (2021.01) |
| *B33Y 10/00* | (2015.01) |
| *B33Y 30/00* | (2015.01) |
| *B33Y 50/02* | (2015.01) |

(52) U.S. Cl.

CPC .............. *B22F 10/85* (2021.01); *B22F 12/43* (2021.01); *B22F 12/44* (2021.01); *B22F 12/49* (2021.01); *B22F 12/90* (2021.01); *B33Y 10/00* (2014.12); *B33Y 30/00* (2014.12); *B33Y 50/02* (2014.12); *B22F 10/25* (2021.01); *B22F 10/36* (2021.01); *B22F 12/41* (2021.01)

(58) Field of Classification Search

CPC .......... B22F 12/49; B22F 12/43; B22F 12/90; B22F 10/39; B22F 10/28; B22F 10/366; B22F 12/41; B22F 10/25; B22F 10/36

USPC ....................................................... 219/121.8

See application file for complete search history.

(56) References Cited

U.S. PATENT DOCUMENTS

| | | | | |
|---|---|---|---|---|
| 2018/0093416 | A1* | 4/2018 | Prexler | ................. B29C 64/268 |
| 2018/0186082 | A1* | 7/2018 | Randhawa | ............. B22F 12/44 |
| 2018/0297117 | A1 | 10/2018 | Kanko et al. | |
| 2019/0047228 | A1* | 2/2019 | Brown | ............... G05B 19/4015 |
| 2019/0077081 | A1* | 3/2019 | Susnjara | ................ B33Y 30/00 |
| 2019/0270161 | A1 | 9/2019 | Allenberg-Rabe et al. | |
| 2020/0023585 | A1* | 1/2020 | Wiesner | .................. B29C 64/20 |
| 2020/0061925 | A1* | 2/2020 | Klaußner | .............. B29C 64/268 |
| 2024/0059020 | A1* | 2/2024 | Milshtein | ................ B22F 12/63 |

FOREIGN PATENT DOCUMENTS

| | | |
|---|---|---|
| EP | 3736110 | 11/2020 |
| WO | WO 2017/085470 | 5/2017 |
| WO | WO 2020/094261 | 5/2020 |
| WO | WO 2020/249460 | 12/2020 |

OTHER PUBLICATIONS

PCT International Search Report and Written Opinion in International Appln. No. PCT/EP2019/080871, dated Mar. 4, 2020, 7 pages.

EP Office Action in European Appln. No. 19805565.9, mailed on Oct. 24, 2023, 14 pages (with English translation).

PCT International Preliminary Report on Patentability in International Appln. No. PCT/EP2019/080871, dated May 20, 2021, 6 pages.

* cited by examiner

Scanning the optical working
beam 5 across the working
area 7

S1

Detecting signal values of
remitted light in a location-
dependent manner

S2

Assigning a signal value to
each location 11 of the scan

S3

Obtaining an image from the
location-dependent detected
signal values

S4

Evaluating the image

S5

METHODS FOR DETECTING A WORKING AREA OF A GENERATIVE MANUFACTURING DEVICE AND MANUFACTURING DEVICES FOR GENERATIVELY MANUFACTURING COMPONENTS FROM A POWDER MATERIAL

CROSS REFERENCE TO RELATED APPLICATIONS

This application is a continuation of and claims priority under 35 U.S.C. § 120 from PCT Application No. PCT/EP2019/080871, filed on Nov. 11, 2019, which claims priority from German Application No. 10 2018 219 301.0, filed on Nov. 12, 2018. The entire contents of each of these priority applications are incorporated herein by reference.

TECHNICAL FIELD

The disclosure relates to methods for detecting a working area of a generative manufacturing device and the manufacturing devices for generatively manufacturing components from a powder material that use these methods.

BACKGROUND

In generative manufacturing devices, there is a fundamental requirement to monitor a working area in which a component is generatively built up from a powder material. This relates in particular to the monitoring of newly applied powder layers, e.g., for any areas with a lack of coating or tear-off edges, the analysis of melted areas of a powder layer, the detection of the resulting component, as well as other requirements.

Increasingly, it is also becoming apparent that certain components are not manufactured generatively as a whole, e.g., because of the resulting cost and speed advantages, but rather certain sections of a component, in which the advantages of this process are particularly realized, are built up generatively on a classically produced basic mold, a so-called preform. This makes it possible to manufacture the preform, for example, a clamping shank of a tool, for which generative manufacturing would have no advantages, quickly and, in particular, cost-effectively in a conventional manner, wherein only that component geometry is subsequently built up generatively on the preform, which could not be manufactured in a conventional manner or only at significantly greater expense. The resulting product, which has one or more components produced by generative manufacturing and one or more components produced using classical techniques are referred to herein a mixed or hybrid components.

US 2018/0297117 A1 describes a method and a system in which optical interferometry is used in the context of material modification processes, in particular for process monitoring and/or process control. In this context, if a material modification beam source is also used as an imaging light source, the material modification beam source is operated with that output power which is also used for the material modification process, so that the process carried out with the material modification beam can be interferometrically monitored and/or controlled.

SUMMARY

It is important for good quality of mixed (hybrid) component products, to have a precise knowledge of the position of a preform in a working area, so that the generatively produced component area can be built up on the classically produced preform with high accuracy, without any offset. In particular, it is necessary to detect the position of the preform with an accuracy of a few tenths of a micron. In principle, separate measuring devices or measuring devices that are specifically integrated into the generative manufacturing device for this purpose can be used for this purpose. However, there are two influencing variables that can affect the position determination. First, the accuracy of the measuring device used itself, and second, the registration accuracy between the measuring device and a scanner for shifting an optical working beam for the generative manufacturing.

The present disclosure provides methods and systems that solve the problem of detecting a working area of a generative manufacturing device, as well as new generative manufacturing devices for generatively manufacturing components from a powder material that avoid the disadvantages stated above.

In a first aspect, the disclosure provides methods for detecting a working area of a generative manufacturing device, including the following steps: scanning an optical working beam of the generative manufacturing device across all or a portion or portions of the working area; detecting signal values of light of the optical working beam remitted along an optical axis of the optical working beam based on location, thereby assigning a signal value to each location of the scan of the optical working beam in the working area; and obtaining an image of the working area from the location-dependent detected signal values.

By detecting remitted light from the optical working beam in a location-dependent manner and obtaining an image of the working area from it, it is possible to use the optical working beam itself to detect the working area, so that there is no need for separate measuring devices or measuring devices specifically provided for the purpose of detecting the working area. The detection of remitted light makes it possible to observe the working area with a comparatively small optical output power of the working beam, because there is no need to resort to process light and/or thermal emissions occurring in power ranges of the optical working beam which could lead to a change of materials placed in the working area, be it a preform or a powder material. Thus, the detection of the working area can be carried out without damage and/or without influencing a subsequent build-up process for the manufacturing of a generative component.

Because the remitted light is detected along the optical axis of the optical working beam, the location-dependent detection of the signal values takes place directly in the coordinate system of the scanner, so that the otherwise required registration between a measuring device and the scanner is completely unnecessary. This also eliminates the previously mentioned sources of error, and the detection of the working area is very accurate. Thus, the position of a preform can be determined very precisely. If the optical working beam is used to detect the working area, then additional sensor components are also eliminated in both a simple and cost-effective manner. The process can therefore be carried out very simply and inexpensively. In particular, it is advantageous to use components of the generative manufacturing device that are already present, so that it is only necessary to implement the process in control software of the generative manufacturing device, which is fast, simple, inexpensive and also possible by way of retrofitting for existing generative manufacturing devices.

Generative manufacturing is understood here to mean additive manufacturing of a component. In particular, it is understood to mean a layer-by-layer construction of a component from powder material. In particular, a generative manufacturing device is used which is arranged for building up a component layer-by-layer from a powder material, e.g., for carrying out a powder bed-based manufacturing process, e.g., for carrying out a generative manufacturing process selected from a group consisting of a selective laser sintering, a laser metal fusion (LMF), a direct metal laser melting (DMLM), a laser net shaping manufacturing (LNSM), and a laser engineered net shaping (LENS).

As used herein, an optical working beam is directed electromagnetic radiation, continuous or pulsed, which is suitable with regard to its wavelength or a wavelength range for generatively manufacturing a component from powder material, in particular for sintering or melting the powder material. For example, an optical working beam is understood to be a laser beam, which can be generated continuously or pulsed. The optical working beam can have a wavelength or a wavelength range in the visible electromagnetic spectrum or in the infrared electromagnetic spectrum, or in the overlap range between the infrared range and the visible range of the electromagnetic spectrum.

The optical working beam can be scanned in the entire working area within the scope of the method to detect the entire working area. However, it is also possible for the optical working beam to be scanned within the scope of the method only in a detection section of the working area, i.e., a subsection of the working area that is to be detected, to detect the detection section. It is also possible to detect a plurality of separate detection sections in the working area separately with the optical working beam.

In particular, the remitted light of the optical working beam is detected along an optical axis of the optical working beam by positioning a light detector arranged to detect the remitted light on the optical axis.

In some embodiments, for this purpose, a beam device arranged to generate the optical working beam has a deflection mirror via which the optical working beam is deflected, wherein the reflectivity of the deflection mirror is less than 100%, so that a portion of the light remitted along the optical axis passes through the deflection mirror and falls on a light detector arranged downstream of the deflection mirror. Alternatively, it is also possible to send the optical working beam through the deflection mirror, wherein in this case the deflection mirror has a transmissivity of less than 100%, wherein in this case the light detector is arranged such that the remitted light is partially deflected by the deflection mirror and is directed to the light detector.

Furthermore, it is also possible for the optical working beam to pass through an aperture of a deflection mirror, wherein remitted light is at least partially deflected from the surface of the deflection mirror surrounding the aperture and is guided to the light detector. In particular, a so-called scraper mirror can be used.

If the deflection mirror is arranged to deflect the optical working beam and to transmit the remitted light, it can have a reflectivity of at least 99% to at most 99.98%. If the deflection mirror is arranged for transmission of the optical working beam and for reflection of the remitted light, it can have a transmissivity of at least 99% to at most 99.98%.

Alternatively, it is also possible to use a polarization beam splitter instead of the deflection mirror, wherein in this case the optical working beam is preferably linearly polarized. The polarization is at least partially destroyed by the remission, e.g., scattering, wherein the polarization direction perpendicular to the incident working beam then contains only the remitted signal. The polarization beam splitter thus reflects the incident light of the optical working beam linearly polarized with a certain polarization direction and transmits the polarization direction perpendicular to the certain polarization direction—or vice versa.

The term "remitted light" is understood herein to mean light, e.g., laser light, that is reflected and/or scattered, e.g., back-scattered, from a surface in the working area. Here, "reflection" is understood in a narrower sense to mean directed reflection, while "scattering" is understood to mean diffuse reflection, in particular according to Lambert's law.

The term "registration accuracy" is understood to mean in particular the accuracy of a transformation from the coordinate system of the measuring device to the coordinate system of the scanner. In particular, this registration accuracy is directly influenced by instabilities and/or drifts in the measuring device as well as in the scanner. Such error contributions lead—in particular cumulatively with one another—directly to a reduction in the quality and/or accuracy of the resulting component, in particular to an offset between the preform and the generatively manufactured component section built thereon. This problem occurs regardless of the choice of the measuring device for the position determination, be it triangulation sensors, photogrammetric sensors, stripe light projection sensors, optical cameras, photodiodes, or line sensors, which detect the working area independently of the scanner.

The signal values are detected in a pointwise, e.g., one-dimensional, location-dependent manner. Each location of the scan of the optical working beam is thus preferably assigned exactly one signal value. Such a signal value can be a brightness value.

In contrast, an image of the working area is understood to be in particular a two-dimensional image of the working area, e.g., of at least one detection section of the working area. The image is obtained, for example, by composing, calculating, or otherwise forming the image from the location-dependent detected signal values.

According to another embodiment, the disclosure provides that no interference signal is detected. In particular, no interference signals are detected as signal values. The methods can thus be carried out very easily and a simple optical image of the working area can be obtained.

Alternatively or additionally, signal values can be detected that increase with increasing intensity of the remitted light. The signal values are thus related in a simple manner to the intensity of the remitted light. Also, in this respect, a simple optical image of the working area can be obtained, which can be easily evaluated.

Alternatively or additionally, brightness values, e.g., brightness values of the remitted light, can be detected as signal values. This also represents a particularly simple embodiment of the methods, in which an easily evaluated optical image of the working area is obtained.

In another embodiment, the disclosure provides that the image of the working area is evaluated for the recognition of geometric structures. Thus, a specific evaluation of the image is performed within the scope of the method to recognize at least one geometric structure in the working area. In some embodiments, the image is evaluated for edges, and thus edge detection can be applied to the image.

The positioning accuracy of a typical scanner of a generative manufacturing device allows obtaining the image of the working area with a resolution of about 40,000 pixels per square millimeter, at a pixel pitch of about 5 μm.

By means of suitable algorithms for evaluating the image, edge detection with sub-pixel accuracy can also be performed, so that the accuracy of the detection of the working area, e.g., the detection of a position of a preform in the working area, can be further increased.

According to a further embodiment, the disclosure provides that the signal value of the remitted light is detected by a photodiode arranged on the optical axis of the optical working beam. This represents a simple and inexpensive way to detect the optical signal values. For example, a silicon photodiode can be used as the photodiode, and the photodiode can be sensitive to light in the visible and/or infrared spectral range. In some embodiments, the sensitivity of the photodiode is matched to the wavelength range of the optical working beam. For example, an infrared photodiode or a pyrometer diode can be used.

The signal value can be detected in a spatially resolved manner by assigning an output signal of the photodiode to an instantaneous state, in particular an internal state, of the scanner in a time-dependent manner. The detection of the signal values, in this case the output signal of the photodiode, and the shift or scanning of the optical working beam by a corresponding control of the scanner thus takes place synchronously, so that each signal value can be assigned a state of the scanner and thus at the same time a location in the working area. The state of the scanner can be a position of at least one movable mirror of the scanner, e.g., a galvanometric mirror, which in turn is assigned to a location in the working area to which the optical working beam is directed. The spatially resolved detection of the signal values thus takes place directly in the coordinate system of the scanner.

According to a further development, the disclosure provides that a resolution of the detection of the working area is adjusted or modified. In particular, the resolution can be selected according to demand. In some embodiments, the resolution is adjusted by carrying out the shift or scan of the optical working beam with a corresponding step width. However, it is also possible to select the resolution by selective time-dependent evaluation of the light detector, for example, by detecting the output signal not continuously, but rather only at predetermined intervals that are greater than a time interval between two successive output signal values. By adjusting the resolution, it is possible, on the one hand, to provide a high resolution when this is desirable or necessary, and, on the other hand, to reduce the data volume advantageously when a lower resolution is sufficient.

Alternatively or additionally, a detection section of the working area can be adjusted or changed. In particular, the detection section can be selected according to demand. It is also possible that several detection sections separated from each other are defined. This can also be done, in turn, by the optical working beam being shifted or scanned only within a specific detection section, or by the output signal of the light detector being evaluated only within the specified detection section.

The resolution and/or the detection section can in particular be selected dynamically, e.g., by software configuration. In particular, it is thus also possible, for example, to carry out a powder bed analysis with higher spatial resolution than a detection of a position of a preform, e.g., to be able to detect defects in the powder bed, such as in a newly applied powder layer, more precisely.

According to a further embodiment, the disclosure provides that a position of at least one preform within the working area is determined from the image of the working area. By a position of the preform within the working area is meant herein a position of the preform in the coordinate system of the optical working beam, wherein the preform is arranged in the working area. The position of the preform in the working area can be determined, e.g., in the coordinate system of the optical working beam, with the methods proposed herein with very high accuracy, so that generatively manufactured component sections can be built on the preform with high accuracy and quality, and with extremely low or no offset.

According to a further embodiment, the disclosure provides that the position of the preform is determined based on at least one edge of the preform, which is recognizable in the image. An edge recognizable in the image is to be understood as an edge recognizable by machine, e.g., with the aid of an edge detection algorithm. Such an edge detection enables the position of the preform to be determined in a very precise and, at the same time, less time-consuming manner. No additional work steps or changes to the preform are required.

An edge detection is possible, for example, based on sharp jumps in the location-dependent detected signal values. For example, the remission behavior of the preform changes discontinuously at an edge. This also applies if the preform is surrounded by powder material, namely working powder of the generative manufacturing device, or embedded in powder material, wherein a surface of the preform facing the scanner is not covered by powder material. If the optical working beam crosses an edge of this surface, the remission behavior changes from strong scattering by the powder material to at least rather directed reflection on the surface of the preform—or vice versa. In this case, the signal value typically has a higher level, e.g., a higher brightness, if the light of the optical working beam is diffusely backscattered, since an at least partially directional reflection is directed away from the optical axis of the optical working beam at least in a large majority of cases, so that no or only little light reaches back to the light detector.

In this context, a working powder is understood to be a powder material that is used in the generative manufacturing device or by the generative manufacturing device to produce a component from the powder material.

In certain embodiments, the process is carried out with a roughened surface of the preform, wherein the surface can be sand-, corundum-, or glass bead-blasted. In this way, the surface of the preform can be provided with matt diffuse scattering optical properties, so that it does not simply appear dark in the image of the working area—possibly with individual bright spots—but is rather easily recognizable. If the roughness of the surface is suitably adjusted, an excellent contrast to any powder material arranged near the surface is nevertheless obtained. For example, it may thus also be possible to increase the signal value from the roughened surface above the level of the signal value of the scattering of the powder material.

Alternatively or additionally, the position of the preform can be determined by means of at least one marking provided on a surface of the preform. Also in this way, a very high accuracy of the position determination for the preform can be achieved.

The surface of the preform on which the marking can be arranged to face the scanner. For example, a top surface of the preform can be so arranged.

A marking on a surface of the preform introduces at least one edge there, which can then, in turn, be detected by means of edge detection, e.g., automatically.

According to a further embodiment, the disclosure provides that at least one notch of the preform filled with the working powder is used as a marking on the surface of the preform. The surface of the preform is incidentally not coated with working powder, so that—as previously described—a clear difference in the location-dependent detected signal values occurs, depending on whether the optical working beam falls on working powder inside the notch, or outside the notch on the essentially directionally reflecting surface of the preform.

A width of the at least one notch can be much smaller than an extension of the notch along its longitudinal direction, i.e., its longest extension.

In certain embodiments, at least two notches oriented obliquely to one another, e.g., perpendicular to one another, for example in the form of a cross, can be used as markings, with both notches preferably being filled with working powder.

A position determination of the preform on the basis of at least one marking on the surface of the preform can also be carried out by observing a process light along the optical axis of the optical working beam, which is caused by the optical working beam on the surface of the preform—and optionally in the notch filled with working powder. The process light is significantly stronger in the area of the powder material than on the powder material-free surface of the preform, in particular due to the increased absorption compared to the bare metal with simultaneously reduced thermal conductivity.

In certain embodiments, the process light and the respective associated position of the optical working beam are logged in a measurement card. For example, an analysis software can then be used to determine the position and/or intersection points of working powder-filled notches and thus ultimately also the position of the preform in the coordinate system of the working beam, e.g., in the coordinate system of the scanner.

The working area can be sampled, e.g., scanned, point-by-point with the optical working beam along lines offset parallel to one another.

For detection of the position of the preform on the basis of the at least one marking on the surface of the preform, a camera can be used that is arranged remote from the optical axis, i.e., arranged outside the optical axis of the optical working beam, or a photodiode arranged outside the optical axis, e.g., a pyrometer diode, can alternatively or additionally be used.

In another embodiment, the process includes using the image of the working area for powder bed monitoring, e.g., for detecting defects in a newly applied powder layer, for analyzing a melted powder layer, and/or for monitoring a resulting generatively manufactured component. In certain embodiments, it is possible for steps of detecting the working area to be interposed between generative manufacturing steps. For example, the optical working beam can be generated in the generative manufacturing steps with a first optical output power, wherein it is generated in the detection steps with a second optical output power that is smaller than the first optical output power.

According to a further embodiment, the disclosure provides that the optical working beam for detecting the working area is operated with an optical output power that is lower than a lower power limit for the optical output power of the optical working beam for generative manufacturing. In this way, a change of material arranged in the working area, be it powder material or a preform, is avoided. In particular, the lower power limit is selected in such a way that a material change, e.g., a sintering or melting, of the powder material of the generative manufacturing device occurs only from this lower power limit or above this lower power limit, so that generative manufacturing with the optical working beam is possible.

The optical output power of the optical working beam can thus be selected to be higher than the lower power limit for generative manufacturing. Thus, an operating mode for detecting the working area on the one hand, and an operating mode for generative manufacturing on the other hand, are clearly separated from each other with regard to the selected optical output power of the optical working beam. In this way, simple and/or easy-to-interpret optical images of the unchanged working area, e.g., of the working area that is not influenced by the working beam, can be obtained, e.g., before the actual working process, i.e., the generative manufacturing.

In some embodiments, the same optical working beam—except for the reduction of the optical output power, if necessary—is used both for the generative manufacturing and for the detection of the working area.

According to certain embodiment, the lower power limit is about 100 W. The optical working beam can be operated with an optical output power of at least about 1 W to at most about 99.9 W, e.g., from at least about 2 W to at most about 50 W, for detecting the working area. For generative manufacturing, the optical working beam is typically operated with an optical output power of at least about 100 W, e.g., more than 100 W, e.g., from at least about 100 W to at most about 500 W.

In another aspect, the disclosure also provides manufacturing devices for generatively manufacturing a component from a powder material, in which a beam device is arranged to generate an optical working beam to generatively, e.g., additively, manufacture a component from a powder material using the optical working beam. The manufacturing device further includes a working area, which is arranged for generatively manufacturing a component from the powder material in the working area. Furthermore, the manufacturing device includes a scanner arranged for scanning the optical working beam across all or a portion of the working area.

Further, the manufacturing device includes a light detector arranged to detect light of the optical working beam remitted along an optical axis of the optical working beam, wherein the light detector is positioned on the optical axis of the optical working beam. The manufacturing device also includes a control device arranged to control the scanner to scan the optical working beam in the working area, to detect location-dependent signal values of the light detector during the scan of the optical working beam, to assign a signal value of the light detector to each location of the scan of the optical working beam in the working area, and to obtain an image of the working area from the location-dependent detected signal values. These manufacturing devices provide the same advantages already explained in connection with the methods.

In particular, the manufacturing devices are arranged to perform methods as described herein, e.g., methods according to one of the embodiments described above.

In certain embodiments, the control device is arranged to operate the optical working beam for detecting the working area with an optical output power that is reduced compared to a lower power limit for the optical output power of the optical working beam for generative manufacturing.

In some embodiments, the generative manufacturing device is arranged for building up a component layer-by-layer from a powder material, e.g., for carrying out a powder bed-based manufacturing process, e.g., selected from the group disclosed above in this context.

In certain embodiments, the control device is arranged to compose, calculate, or otherwise form the image of the working area from the location-dependent detected signal values. Furthermore, the control device can be arranged to evaluate the image of the working area for the recognition of geometric structures, in particular to perform an edge recognition.

According to a further embodiment, the disclosure provides the beam device is or includes a laser or is configured as a laser. Alternatively or additionally, the light detector can be or include a photodiode or is configured as a photodiode.

DESCRIPTION OF DRAWINGS

The new methods and devices are explained in more detail below with reference to the drawings.

DETAILED DESCRIPTION

Figure 1:
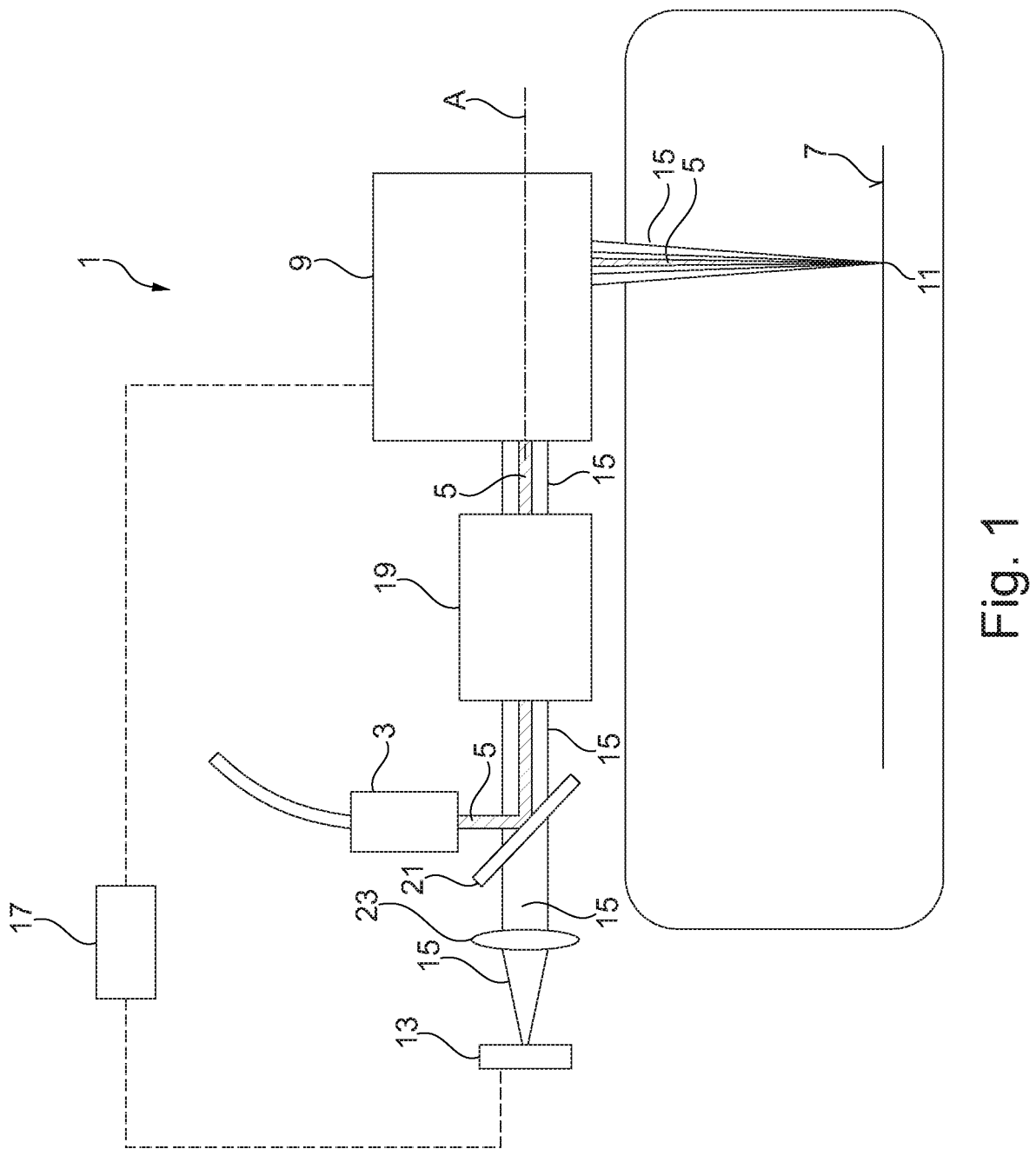
FIG. 1 a schematic representation of an embodiment of a manufacturing device, which is arranged for carrying out an embodiment of a method for detecting a working area of the manufacturing device.

FIG. 1 shows a schematic representation of an embodiment of a manufacturing device 1, which is arranged for generative, e.g., additive, manufacturing of a component from a powder material. For this purpose, the manufacturing device 1 has a beam device 3, which is arranged to generate an optical working beam 5. By means of the optical working beam 5, a component can be manufactured generatively, in particular additively, in a working area 7 of the manufacturing device 1, e.g., by melting or sintering a powder material arranged in the working area 7, which is also referred to as the working powder of the generative manufacturing device 1, in areas by the optical working beam 5 to build up a component generatively, e.g., additively, layer-by-layer in a manner that is otherwise known per se.

The beam device 3 is configured, e.g., as a laser, and the optical working beam 5 can be a laser beam, which can be generated in pulsed or continuous mode.

The manufacturing device 1 further includes a scanner 9, which is arranged to scan the optical working beam 5 in the working area 7. For this purpose, the scanner 9 can have at least one movable mirror, e.g., at least two movable mirrors, e.g., galvanometer mirrors, wherein an instantaneous state of the scanner 9, i.e., an instantaneous position of the at least one movable mirror, is associated in each case with a location 11 in the working area 7 to which the working beam 5 is momentarily aligned. By changing the state of the scanner 9, i.e., changing the position of the at least one mirror, the entire working area 7 can be scanned by the optical working beam 5.

The manufacturing device 1 further includes a light detector 13, which is arranged to detect remitted light 15 of the optical working beam 5 that is remitted along an optical axis A of the optical working beam 5. In this regard, the light detector 13 is arranged on the optical axis A of the generative manufacturing device 1, which is here an axis along which the optical working beam 5 extends at least area by area.

Furthermore, the generative manufacturing device 1 has a control device 17, which is arranged to control the scanner 9 for scanning the optical working beam 5 across the working area 7. For this purpose, the control device 17 is operatively connected to the scanner 9. Furthermore, the control device 17 is arranged to detect signal values of the light detector 13 in a location-dependent manner during the scan of the optical working beam 5, and to assign a signal value of the light detector 13 to each location 11 of the scan of the optical working beam 5 in the working area 7. The control device 17 is also arranged to obtain, e.g., to compose, calculate, or otherwise form, an image of the working area 7 from the location-dependent detected signal values.

In this way, it is possible with a high degree of accuracy to detect the working area 7 simply and at the same time inexpensively, to determine precisely the position of a preform in the working area 7, by measuring this position in the coordinate system of the scanner 9. As a result, it is not necessary to know precisely the absolute position of the location 11 in the working area 7.

The manufacturing device 1 also has a focusing unit 19, e.g., a dynamic focusing unit, to always focus the optical working beam 5 precisely on the working area 7 independent of the instantaneous state of the scanner 9. Dynamic focusing is required here, because the distance of the location 11 currently targeted by the optical working beam 5 from the scanner 9 varies with the instantaneous position of this location 11 and thus also with the instantaneous state of the scanner 9. This in turn results from the planar geometry of the working area 7 and the way in which the optical working beam 5 is scanned by the scanner 9, whereby locations at a constant distance from the scanner 9 would be arranged on a hemisphere around the scanner 9.

A deflection mirror 21 is arranged in the beam path of the optical working beam 5, by means of which the optical working beam 5 is deflected starting from the beam device 3 to the scanner 9, to the focusing unit 19. The deflection mirror 21 has a reflectivity less than 100%. Therefore, it is partially transparent for the remitted light 15 traveling along the optical axis A, which at least partially passes through the deflection mirror 21 along the optical axis A and thus reaches the light detector 13. In this case, a converging lens 23 can be arranged in the beam path of the remitted light 15 behind the deflection mirror 21. Lens 23 converges the remitted light 15 onto the light detector 13, thereby imaging the location 11 onto the light detector 13. Instead of the deflection mirror 21, a scraper mirror or a polarization beam splitter can also be used, wherein in the latter case, the optical working beam 5 is preferably linearly polarized.

The light detector 13 can be configured as a photodiode, e.g., as a silicon photodiode.

The signal values of the light detector 13 can be detected by the control device 17 in a location-resolved manner in that an output signal of the light detector 13 is assigned in a time-dependent manner to a synchronous state of the scanner 9, and thus at the same time to an instantaneous location 11 in the working area 7.

In some embodiments, no interference signals are detected as signal values. Alternatively or additionally, signal values can be detected that increase with increasing intensity of the remitted light. Alternatively or additionally, brightness values can be detected as signal values, e.g., brightness values of the remitted light 15.

The control device 17 is preferably arranged to evaluate the image of the working area 7 for detecting geometric structures, for example, by means of edge detection.

A resolution of the detection and/or a detection section within the working area 7 is/are preferably adjustable, in particular, changeable.

In some embodiments, the control device 17 determines a position of at least one preform within the working area 7 from the image of the working area 7, e.g., on the basis of at least one edge of the preform recognizable in the image, and/or on the basis of at least one marking on a surface of the preform. At least one notch of the preform can be filled with the working powder of the generative manufacturing device 1 for use as a marking.

Figure 2:
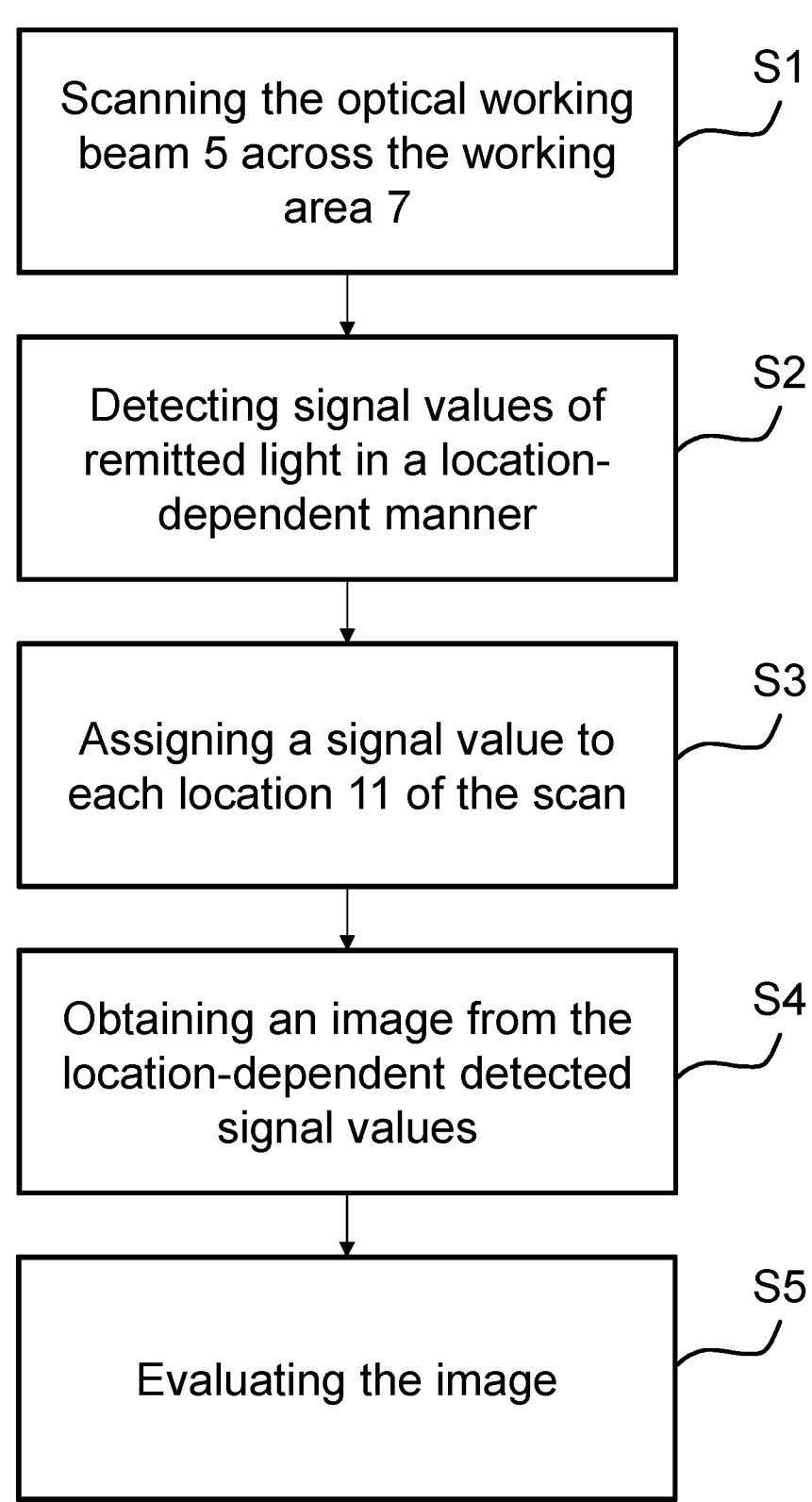
FIG. 2 is a flow chart of an embodiment of the method for detecting the working area of the manufacturing device.

FIG. 2 is a flow chart representing an embodiment of the methods described herein for detecting the working area 7 of the generative manufacturing device 1. Here, in a first step S1, the optical working beam 5 is scanned in the working area 7. In a second step S2, signal values of the remitted light 15 traveling along the optical axis A are detected in a location-dependent manner, e.g., in the coordinate system of the scanner 9. In a third step S3, a signal value is assigned to each location 11 of the scan of the optical working beam 5 in the working area 7, and in a fourth step S4, an image of the working area 7 is obtained from the location-dependent detected signal values, e.g., composed, calculated, or otherwise formed.

In a fifth step S5, the image is evaluated, e.g., automatically by means of the control device 17. The image can be evaluated to detect geometric structures, e.g., by means of an edge detection algorithm. Such algorithms are well known in this field. For example, the image can be used to determine a position of at least one preform in the working area 7. However, it is also possible that the image is used for powder bed monitoring, for analyzing a melted powder layer, and/or for monitoring an emerging generatively manufactured component.

During the detection of the optical working area 7, the optical output power of the optical working beam 5 is reduced compared to the optical output power of the working beam 5 during generative manufacturing.

What is claimed is:

1. A method for imaging a working area of a generative manufacturing device, the method comprising:

scanning an optical working beam of the generative manufacturing device, using a single scanner of the generative manufacturing device, across all or a portion or portions of the working area;

detecting signal values of remitted light of the optical working beam traveling along an optical axis of the optical working beam in a location-dependent manner, and assigning a signal value to each location of the scan of the optical working beam in the working area, wherein the signal value of the remitted light is detected by a light detector arranged on the optical axis of the optical working beam, and wherein the signal value is detected in a spatially resolved manner in that an output signal of the light detector is assigned in a time-dependent manner to a synchronous state of the single scanner for scanning the optical working beam;

making at least one notch on or in a surface of the preform and filling the notch with a working powder of the generative manufacturing device as a marking on the surface of the preform;

obtaining an image of a preform in the working area upon which a component is to be generatively built up from a powder material from the powder bed, from the location-dependent detected signal values; and evaluating the image to analyze or monitor the preform in a coordinate system of the optical working beam or a coordinate system of the single scanner used to scan the optical working beam, wherein evaluating the image comprises determining a position of the preform within the working area based on at least one edge of the preform recognizable in the image; and generatively building the component upon the preform in the working area via the optical working beam using the single scanner of the device, wherein the optical working beam for detecting the working area is operated with an optical output power that is reduced compared to a lower power limit for the optical output power of the optical working beam used during generative manufacturing.

2. The method of claim 1, wherein the generative manufacturing device is arranged for building up a component layer-by-layer from a powder material, for carrying out a powder bed-based manufacturing process.

3. The method of claim 1, wherein a) no interference signal is detected; and/or b) signal values are detected which increase with increasing intensity of the remitted light; and/or c) brightness values are detected as signal values.

4. The method of claim 1, further comprising evaluating the image of the working area for the recognition of geometric structures.

5. The method of claim 1, wherein the light detector that detects the signal value of the remitted light is a photodiode.

6. The method of claim 1, further comprising adjusting a resolution of a detection and/or a detection section of the working area.

7. The method of claim 1, wherein a position of the preform within the working area is further determined based on the marking on the surface of the preform.

8. A manufacturing device for generatively manufacturing a component from a powder material, comprising:

a beam device arranged to generate an optical working beam to generatively manufacture the component from the powder material using the optical working beam;

a working area arranged to support generatively manufacturing the component from the powder material upon the working area;

a single scanner arranged to scan the optical working beam across all or a portion or portions of the working area;

a light detector arranged to detect remitted light of the optical working beam traveling along an optical axis of the optical working beam, wherein the light detector is arranged on the optical axis of the optical working beam; and a control device arranged to control the single scanner for scanning the optical working beam in the working area to detect location-dependent signal values of the light detector during the scan of the optical working beam, to assign a signal value of the light detection to each location of the scan of the optical working beam in the working area, wherein the signal value of the remitted light detected by the light detector is detected in a spatially resolved manner in that an output signal of the light detector is assigned in a time-dependent manner to a synchronous state of the single scanner for scanning the optical working beam to obtain an image of a preform in the working area upon which the component is to be generatively built up from the powder material within the working area, from the location-dependent detected signal values, wherein the preform includes at least one notch on or in a surface of the preform, and wherein the notch is filled with a working powder of the generative manufacturing device as a marking on the surface of the preform, and to evaluate the image to analyze or monitor the preform in a coordinate system of the optical working beam or a coordinate system of the single scanner used to scan the optical working beam, wherein evaluating the image comprises determining a position of the preform within the working area based on at least one edge of the preform recognizable in the image; and to control the single scanner to generatively build the component upon the preform in the working area; wherein the control device is arranged to operate the optical working beam for detecting the working area with an optical output power that is reduced compared to a lower power limit for the optical output power of the optical working beam for generative manufacturing.

9. The manufacturing device of claim 8, wherein the beam device comprises a laser.

10. The manufacturing device of claim 9, wherein the laser is a pulsed laser.

11. The manufacturing device of claim 9, wherein the laser is a continuous laser.

12. The manufacturing device of claim 8, wherein the light detector comprises a photodiode.

13. The method of claim 1, wherein determining the position of the preform in the working area comprises determining the position with an accuracy of a few tenths of a micron.

* * * * *